(12) United States Patent
Cortese

(10) Patent No.: US 6,792,980 B1
(45) Date of Patent: Sep. 21, 2004

(54) METHOD AND DEVICE FOR PIERCING A SEALED CAPSULE ON A COFFEE MACHINE

(75) Inventor: Virginio Cortese, Turin (IT)

(73) Assignee: SGL Italia S.r.l., Turin (IT)

( * ) Notice: Subject to any disclaimer, the term of this patent is extended or adjusted under 35 U.S.C. 154(b) by 0 days.

(21) Appl. No.: 10/452,937

(22) Filed: Jun. 3, 2003

(30) Foreign Application Priority Data

Jun. 7, 2002 (IT) ...................................... TO2002A0481

(51) Int. Cl.[7] .............................. B65B 1/04; B65B 3/04
(52) U.S. Cl. ......................... 141/1; 141/329; 141/330; 99/295; 426/433
(58) Field of Search ............................. 141/1, 2, 9, 10, 141/18, 82, 114, 314, 329, 330; 99/295; 426/77, 112, 433

(56) References Cited

U.S. PATENT DOCUMENTS 3,295,998 A 1/1967 Goros
5,398,595 A * 3/1995 Fond et al. .................... 99/295
5,472,719 A * 12/1995 Favre .......................... 426/77
5,762,987 A 6/1998 Fond et al.
5,897,899 A 4/1999 Fond

FOREIGN PATENT DOCUMENTS

WO    WO 95/25457    9/1995

* cited by examiner

Primary Examiner—Timothy L. Maust
(74) Attorney, Agent, or Firm—Shlsinger, Arkwright & Garvey LLP

(57) ABSTRACT

On a coffee machine, a pressurized-hot-water sprinkler is positioned facing a dispenser cup for receiving a rigid sealed capsule closed, on the side facing the sprinkler, by a foil seal, which is pierced, in use, by a piercing device interposed between the sprinkler and the dispenser cup and having a number of needles, each of which is in the form of a pyramid with concave faces, so that each needle cuts the foil seal into portions defining a non-return blade valve, which closes, when the needle is extracted, to prevent pressurized water from escaping from the sealed capsule onto the sprinkler. (FIGS. 1, 7 and 9).

22 Claims, 4 Drawing Sheets

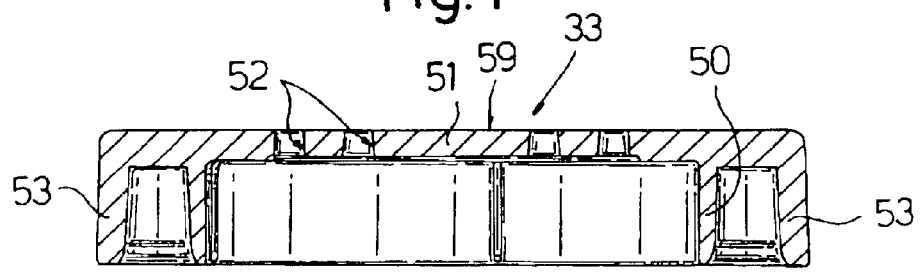
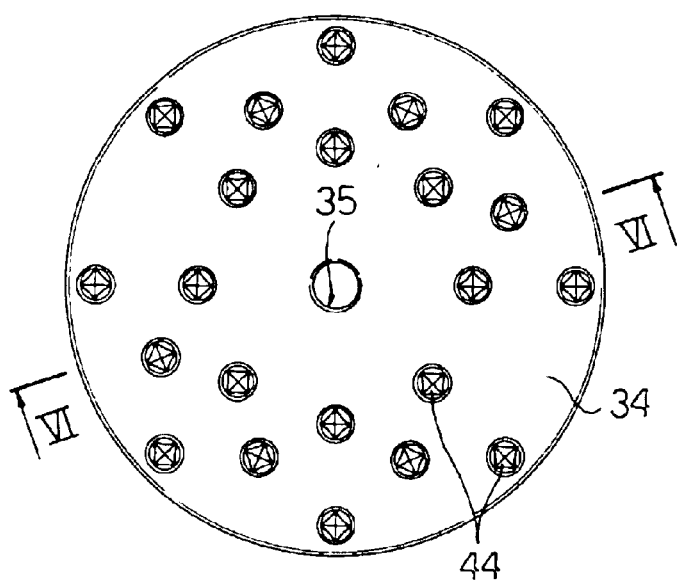
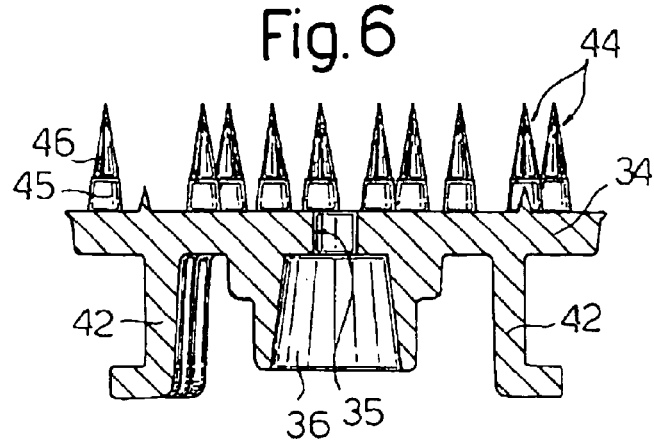

METHOD AND DEVICE FOR PIERCING A SEALED CAPSULE ON A COFFEE MACHINE

The present invention relates to a method of piercing a sealed capsule on a coffee machine.

More specifically, the present invention relates to a method of piercing a sealed capsule on a coffee machine comprising a pressurized-hot-water sprinkler, and a dispenser cup facing the sprinkler and movable with respect to the sprinkler to and from an infusion position in which the dispenser cup is connected to the sprinkler; the dispenser cup housing a rigid sealed capsule for a measure of ground coffee; and the sealed capsule being closed at one end by a foil seal facing the sprinkler in use.

BACKGROUND OF THE INVENTION

On known coffee machines employing sealed capsules, inflow of the pressurized hot water from the sprinkler is normally made possible by piercing the foil seal by means of a number of needles, which are moved through the foil seal when the dispenser cup is moved into the infusion position.

The normally conical or pointed cylindrical needles normally used to pierce the foil seal have created serious problems, owing to the fact that each needle, as it penetrates the foil seal, tends, on the one hand, to form the hole by forcing its way gradually through, and so permanently deforming, the foil seal, and, on the other, to adhere hermetically to the surface of the hole.

In actual use, finding the holes in the foil seal plugged hermetically by the respective needles, the pressurized hot water from the sprinkler tends, firstly, to implode the foil seal and compress the ground coffee inside the sealed capsule, and then to flow between the needles and holes or tear the foil seal. Whichever the case, the overpressure to which the ground coffee is subjected by the foil seal deforming inwards slows down the infusion process, thus resulting in poor-tasting coffee, and, in the event the foil seal is torn, the water tends to form preferential passages through, and only comes into contact with part of, the ground coffee in the sealed capsule. Once the coffee is made, the needles are withdrawn, and the overpressure inside the capsule is released violently through the holes unplugged by the needles, so that part of the ground coffee is normally also released, thus fouling the sprinkler.

SUMMARY OF THE INVENTION

It is an object of the present invention to provide a method of piercing a sealed capsule, designed to eliminate the aforementioned drawbacks.

According to the present invention, there is provided a method of piercing a sealed capsule on a coffee machine, the machine comprising a pressurized-hot-water sprinkler, and a dispenser cup facing said sprinkler and movable with respect to the sprinkler to and from an infusion position in which the dispenser cup is connected to said sprinkler; the dispenser cup housing a rigid sealed capsule for a measure of ground coffee; the sealed capsule being closed at one end by a foil seal facing the sprinkler in use; and the method comprising the step of forming a number of holes through said foil seal, and being characterized in that each said hole is formed by forming through the foil seal a number of cuts extending outwards from a common origin and each defining, together with each adjacent cut, a petal of a non-return blade valve.

The present invention also relates to a piercing device for piercing sealed capsules on a coffee machine.

According to the present invention, there is provided, on a coffee machine, a piercing device for piercing a sealed capsule, the machine comprising a pressurized-hot-water sprinkler, and a dispenser cup facing said sprinkler and movable with respect to the sprinkler to and from an infusion position in which the dispenser cup is connected to said sprinkler; the dispenser cup housing a rigid sealed capsule for a measure of ground coffee; the sealed capsule being closed at one end by a foil seal facing the sprinkler in use; and the piercing device being carried by said sprinkler in a position facing said dispenser cup, comprising a number of needles facing said dispenser cup, and being characterized in that each said needle comprises an active portion for penetrating said foil seal, and which, along the whole of its length, is in the form of a pyramid with concave faces.

BRIEF DESCRIPTION OF THE DRAWINGS

A non-limiting embodiment of the invention will be described by way of example with reference to the accompanying drawings, in which:

FIG. 4 shows a section along line IV—IV in FIG. 3;

FIG. 5 shows a larger-scale plan view of a second detail in FIG. 2;

FIG. 6 shows a section along line VI—VI in FIG. 5;

DETAILED DESCRIPTION OF THE INVENTION

Figure 1:
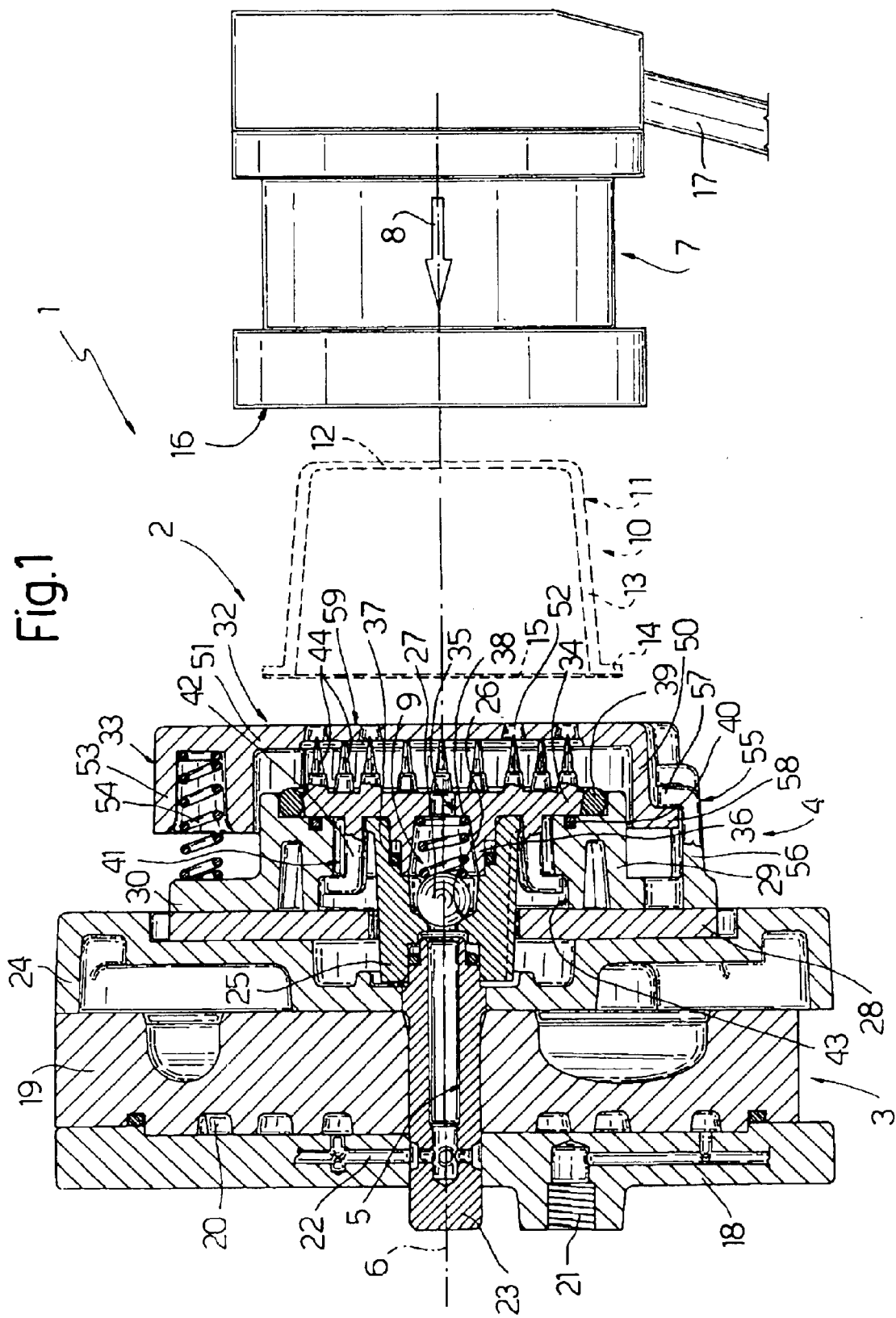
FIG. 1 shows a side view, partly in axial section, of a coffee machine featuring a preferred embodiment of the piercing device according to the present invention.

Number 1 in FIG. 1 indicates as a whole a coffee machine having an infusion assembly 2, in turn comprising a boiler 3, a sprinkler 4 fitted to boiler 3 and for receiving pressurized hot water from boiler 3 along a feed conduit 5 coaxial with sprinkler 4 along an axis 6, and a dispenser cup 7 facing sprinkler 4 and movable to and from sprinkler 4, by a known actuating device not shown, in a direction 8 substantially parallel to axis 6, and between a loading position (FIG. 1) detached from sprinkler 4, and an infusion position (not shown) connected to sprinkler 4. Flow of the pressurized hot water along feed conduit 5 to sprinkler 4 is controlled by a one-way valve 9 calibrated, as explained in detail later on, to only open when the pressure inside the portion of feed conduit 5 upstream from valve 9 reaches a given value.

Dispenser cup 7 houses a ground-coffee container defined by a known rigid sealed capsule 10, which comprises a cup-shaped body 11 containing a measure of ground coffee and having a continuous end wall 12, and a continuous truncated-cone-shaped lateral wall 13 tapering towards end wall 12 and having an outer annular flange 14 at the opposite end to that connected to end wall 12. Sealed capsule 10 is complete with a foil seal 15, which is connected in fluidtight manner to flange 14 to seal the measure of ground coffee inside cup-shaped body 11, and is positioned facing sprinkler 4 when sealed capsule 10 is placed inside dispenser cup 7, with flange 14 resting on a free edge 16 of dispenser cup 7.

Dispenser cup 7 is fitted inside with a known piercing device (not shown) for piercing, in use, end wall 12 of sealed capsule 10 to connect the inside of sealed capsule 10 to a percolator spout 17 fitted to dispenser cup 7.

As shown in FIG. 1, boiler 3, which is known, comprises two mutually contacting plates 18 and 19, which define a coil 20 having, at one end, an inlet 21 for pressurized water from a pump not shown, and, at the other end, an outlet 22 communicating with feed conduit 5, which is formed axially inside a cylindrical insert 23 fitted through holes formed, coaxially with axis 6, through plates 18 and 19, and through a contoured plate 24 interposed between boiler 3 and sprinkler 4. Cylindrical insert 23 projects from contoured plate 24 and fits inside one end of a truncated-cone-shaped sleeve 25, a central portion of which is spanned by a perforated transverse partition defining an annular seat 26 on which rests a ball 27 of valve 9.

Sprinkler 4, located coaxially with axis 6 between contoured plate 24 and dispenser cup 7, is connected integrally to contoured plate 24 and boiler 3 to lock in position a plate 28, which is located between sprinkler 4 and contoured plate 24, has a central hole for the passage of sleeve 25, and projects laterally, in a manner not shown, with respect to sprinkler 4 to support guides (not shown) along which dispenser cup 7 slides in direction 8.

Figure 2:
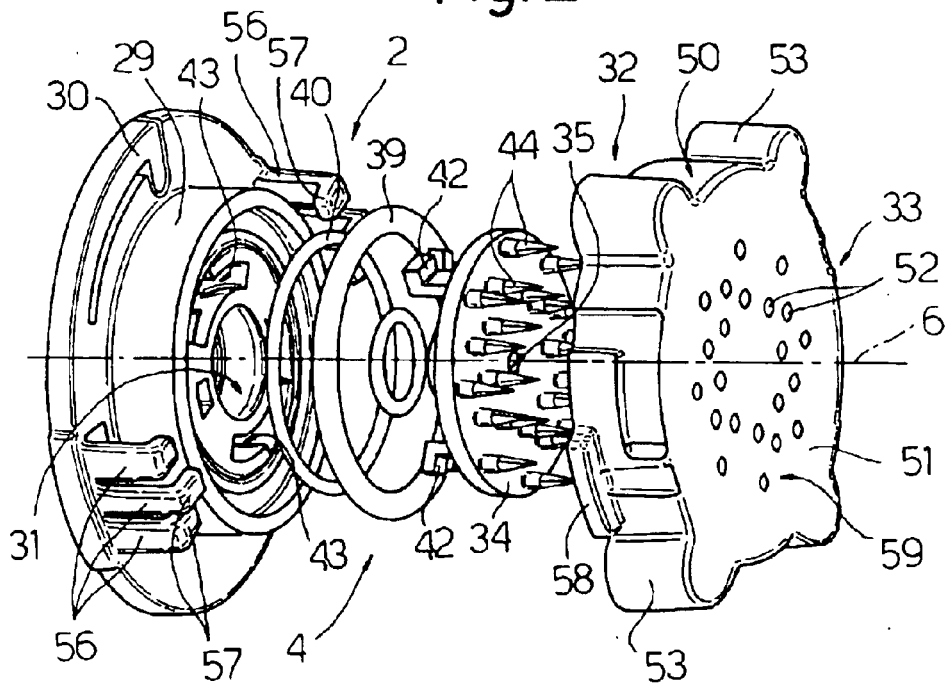
FIG. 2 shows an exploded view in perspective of part of the FIG. 1 machine.

As shown more clearly in FIG. 2, sprinkler 4 comprises a tubular body 29 coaxial with axis 6, and having, at the end facing plate 28, an annular flange 30 connected integrally to contoured plate 24 and plate 19 of boiler 3 in a manner not shown. Tubular body 29 has a central through hole 31 coaxial with axis 6, and housing an end portion of sleeve 25 opposite that engaged by cylindrical insert 23, and supports a piercing device 32 having a perforated cover 33.

Piercing device 32 forms part of sprinkler 4 and comprises, in addition to cover 33, a circular plate 34 coaxial with axis 6, having a central through hole 35 coaxial with axis 6, and having, on the side facing tubular body 29, a tubular appendix 36 fitted in fluidtight manner, with the interposition of a seal 37, inside the end of sleeve 25 opposite that engaged by cylindrical insert 23, to define a seat for a spring 38 by which ball 27 is pushed against seat 26. Plate 34 is fitted in fluidtight manner to the free end of tubular body 29 with the interposition of two annular seals 39 and 40—of which, annular seal 40 surrounds the periphery of plate 34—and is connected removably to tubular body 29 by a bayonet joint 41 defined by L-shaped appendixes 42 extending towards tubular body 29 from plate 34 and alongside tubular appendix 36, and by respective seats 43 formed axially on tubular body 29 and about central hole 31.

Figure 7:
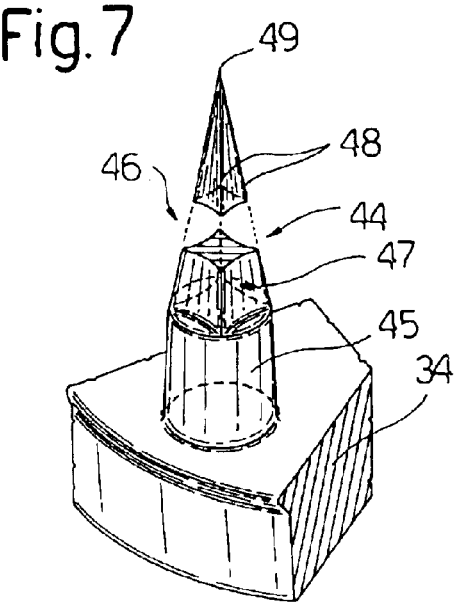
FIG. 7 shows a larger-scale view in perspective of a detail in FIGS. 5 and 6.

On the side facing dispenser cup 7, plate 34 has a number of needles 44 integral with plate 34 and extending, parallel to axis 6, from plate 34 towards dispenser cup 7. As shown in FIG. 7, each needle 44 comprises a substantially cylindrical base portion 45, and an active tip portion 46 in the form of a four-sided pyramid, wherein each face 47 is a concave face connected to each adjacent face 47 along a cutting edge 48, and having a radius of curvature which decreases gradually, from the end of face 47 connected to base portion 45, to zero at a tip 49.

Figure 3:
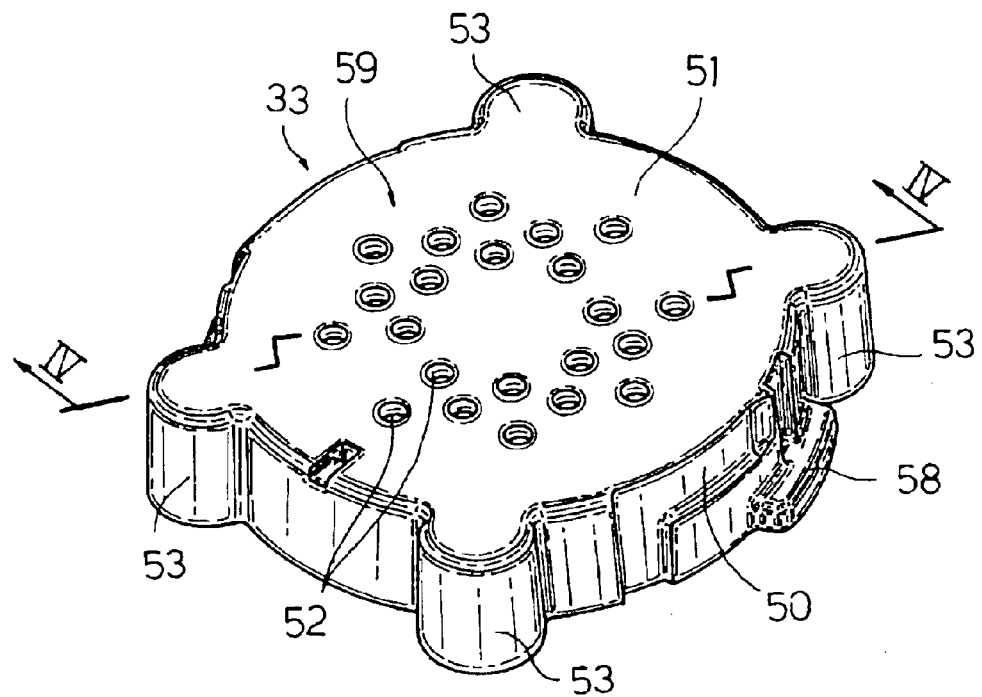
FIG. 3 shows a larger-scale view in perspective of a first detail in FIG. 2.

As shown more clearly in FIGS. 1, 3 and 4, cover 33 is cup-shaped, is coaxial with axis 6 with its concavity facing boiler 3, and is connected in axially-sliding manner to tubular body 29. Cover 33 comprises a cylindrical lateral wall 50, an inner surface of which is fitted in sliding manner to an outer surface of tubular body 29; and an end wall 51 parallel to and facing plate 34, and having a number of truncated-cone-shaped holes 52, each coaxial with a respective needle 44.

Cover 33 comprises, outwards of lateral wall 50, a number of hollow projections 53, each defining a seat for the end of a respective spring 54 parallel to axis 6 and compressed between cover 33 and flange 30 of tubular body 29, and is connected axially to tubular body 29 by an elastic bayonet joint 55 defined by L-shaped appendixes 56 projecting, parallel to axis 6, from flange 30 towards dispenser cup 7 and having radial end teeth 57 facing axis 6, and by corresponding circumferential ribs 58 projecting outwards from lateral wall 50 and crosswise to axis 6. The height of appendixes 56 and the thickness of ribs 58 are such as to allow cover 33 to slide, along tubular body 29 and in opposition to springs 544 between an extracted rest position wherein ribs 58 cooperate with relative teeth 57, and tips 49 of needles 44 are located inside relative holes 52, and a withdrawn work position (not shown) wherein end wall 51 of cover 33 rests in fluidtight manner on annular seal 39, and substantially the whole of active tip portion 46 of each needle 44 projects outwards of end wall 51. In this connection, it should be pointed out that the thickness of wall 51 is preferably at least equal to the height of base portion 45 of each needle 44.

In actual use, after receiving sealed capsule 10 in the loading position shown in FIG. 1, dispenser cup 7 is moved in direction 8 into an infusion position (not shown) contacting sprinkler 4 by a known actuating device (not shown) normally defined by a hydraulic cylinder, which is fed with pressurized hot water parallel to feed conduit 5 and at a lower pressure than that opening valve 9.

When dispenser cup 7 comes to the end of its travel towards sprinkler 4, sealed capsule 10, the foil seal 15 of which rests in fluidtight manner on an outer surface 59 of end wall 51 of cover 33, slides cover 33 axially along tubular body 29 in opposition to springs 54, which compress, so that needles 44 project from end wall 51 and cut foil seal 15, practically without flexing it, to form respective holes 60 through foil seal 15.

Figure 8:
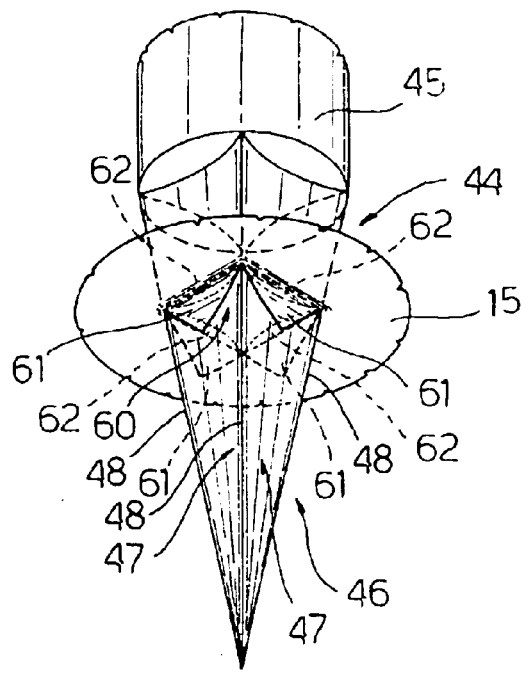
FIG. 8 shows a larger-scale view in perspective of a detail of a sealed capsule in use.
Figure 9:
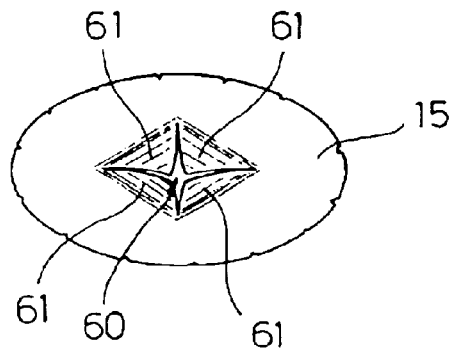
FIG. 9 shows a view in perspective of the FIG. 8 detail after use.

Given the shape and cutting edges 48 of needles 44, each hole 60 is defined by a group of cuts extending outwards from a common origin, and, in the example shown (FIGS. 8 and 9), is substantially in the form of a cross cut defining, in foil seal 15, a number of flexible blades or petals 61, one for each face 47 of relative needle 44, which flex elastically inwards of sealed capsule 10 to define, with relative concave faces 47, is respective free passages 62.

When end wall 51 is arrested in the withdrawn position contacting seal 39, the pressure upstream from valve 9 increases to open valve 9, and pressurized hot water flows through hole 35 into a chamber defined by plate 34 and by end wall 51 in the withdrawn position against seal 39. From this chamber, the pressurized hot water flows into sealed capsule 10 through the gaps between cylindrical base portions 45 and the truncated-cone-shaped surfaces of respective holes 52 in end wall 51, and through passages 62 of holes 60, without exerting any overpressure on foil seal 15. Free passages 62 eliminate the risk of the perforated foil seal 15 being ripped by the pressure of the hot water, which, instead, flows freely into sealed capsule 10 and is distributed evenly throughout the ground coffee in the sealed capsule, without forming any preferential passages.

Substantially simultaneous piercing of the end wall 12 of sealed capsule 10 by a further, known, piercing device (not shown) on dispenser cup 7 allows the liquid coffee to reach and flow out through percolator spout 17.

When the water supply from boiler 3 is cut off and dispenser cup 7 detached from sprinkler 4 in direction 8 by external control, needles 44 are withdrawn gradually from relative holes 60, and the residual water pressure inside the sealed capsule deforms petals 61 of each hole 60 outwards to substantially close hole 60 and produce sufficient hydraulic resistance to prevent water and ground coffee from "exploding" out of sealed capsule 10 onto sprinkler 4. In other words, given its shape, each hole 60 acts as a non-return blade valve preventing fouling of sprinkler 4 once percolation is completed.

What is claimed is:

1. A method of piercing a sealed capsule on a coffee machine, the machine comprising a pressurized-hot-water sprinkler, and a dispenser cup facing said sprinkler and movable with respect to the sprinkler to and from an infusion position in which the dispenser cup is connected to said sprinkler; the dispenser cup housing a rigid sealed capsule for a measure of ground coffee; the sealed capsule being closed at one end by a foil seal facing the sprinkler in use; the method comprising the step of;
   forming a number of holes through said foil seal, wherein each said hole is formed by a piercing needle producing a number of cuts extending outwards from a common origin and each cut defining, together with each adjacent cut, a petal that acts as a non-return blade valve to prevent leakage of pressurized hot water from inside said capsule through said hole, and, when cooperating with the other relevant petals, to substantially close off the relevant hole when said capsule is moved away from said sprinkler and said piercing needle.

2. A method as claimed in claim 1, wherein said cuts define, as a whole, a cross cut.

3. A method as claimed in claim 1, wherein said piercing needle includes an active tip portion which is substantially in the form of a pyramid having a number of faces, each of which defines, with each adjacent face, a connecting cutting edge.

4. A method as claimed in claim 3, wherein each said face is concave.

5. A method as claimed in claim 4, wherein each said concave face of said needle has a radius of curvature decreasing gradually to zero towards a tip of the needle.

6. A method as claimed in claim 5, wherein said needle is inserted through said foil seal in such a manner that only part of said active tip portion passes through the foil seal.

7. On a coffee machine, a piercing device for piercing a sealed capsule, the machine comprising a pressurized-hot-water sprinkler, and a dispenser cup facing said sprinkler and movable with respect to the sprinkler to and from an infusion position in which the dispenser cup is connected to said sprinkler; the dispenser cup housing a rigid sealed capsule for a measure of ground coffee; the sealed capsule being closed at one end by a foil seal facing the sprinkler in use; and the piercing device being carried by said sprinkler in a position facing said dispenser cup, comprising a number of needles facing said dispenser cup, and being characterized in that each said needle comprises an active portion for penetrating said foil seal, and which, along the whole of its length, is in the form of a pyramid with concave faces.

8. A device as claimed in claim 7, wherein each said face defines, with each adjacent face, a connecting cutting edge.

9. A device as claimed in claim 7, wherein each said concave face of each said needle has a radius of curvature decreasing gradually to zero towards a tip of the needle.

10. A device as claimed in claim 7, and comprising a plate supporting said needles, and a cover comprising an end wall having a number of holes, each of which is aligned with a respective said needle; said end wall being located between said plate and said dispenser cup, and being movable, in opposition to the thrust of elastic means, from an extracted position covering said needles, to a withdrawn position wherein said needles project from said end wall through the respective said holes and towards said dispenser cup.

11. A device as claimed in claim 10, wherein said needles are so sized as to project from said end wall, when the end wall is in said withdrawn position, by a portion included entirely in said active tip portion.

12. A device as claimed in claim 10, wherein each said needle comprises, in addition to said active tip portion, a base portion of a height at most equal to a thickness of said end wall.

13. A device as claimed in claim 12, wherein said base portion is cylindrical.

14. A device as claimed in claim 10, wherein said holes are truncated-cone-shaped.

15. A device as claimed in claim 10, wherein said cover is supported by a tubular supporting body via the interposition of said elastic means, and is connected axially to the tubular supporting body by an elastic bayonet joint.

16. A device as claimed in claim 15, wherein said plate is supported by said tubular supporting body, and is connected axially to the tubular supporting body by a bayonet joint.

17. A coffee machine for sealed capsules, comprising a piercing device as claimed in claim 7.

18. A method of piercing a sealed capsule on a coffee machine, the machine comprising a pressurized-hot-water sprinkler, and a dispenser cup facing said sprinkler and movable with respect to the sprinkler to and from an infusion position in which the dispenser cup is connected to said sprinkler; the dispenser cup housing a rigid sealed capsule for a measure of ground coffee; the sealed capsule being closed at one end by a foil seal facing the sprinkler in use; the method comprising the step of:
   forming a number of holes through said foil seal, each said hole being formed by inserting, through said foil seal, a respective needle, at least an active tip portion of which is substantially in the form of a pyramid having a number of concave faces, each of which defines, with each adjacent face, a connecting cutting edge; said cutting edge forming, when inserted through the foil seal, a number of cuts extending outwards from a common origin and each cut, defining together with each adjacent cut, a petal of a non-return blade valve.

19. A method of piercing a sealed capsule on a coffee machine, the machine comprising a pressurized-hot-water sprinkler, and a dispenser cup facing said sprinkler and movable with respect to the sprinkler to and from an infusion position in which the dispenser cup is connected to said sprinkler; the dispenser cup housing a rigid sealed capsule for a measure of ground coffee; the sealed capsule being closed at one end by a foil seal facing the sprinkler in use; the method comprising the step of:
   forming a number of holes through said foil seal, each said hole being formed by inserting, through said foil seal, a respective needle, at least an active tip portion of which is substantially in the form of a pyramid having a number of concave faces, each of which defines, with each adjacent face, a connecting cutting edge.

20. A method as claimed in claim 19, wherein said cuts define, as a whole, a cross cut.

21. A method as claimed in claim 19, wherein each concave face of each said needle has a radius of curvature decreasing gradually to zero towards a tip of the needle.

22. A method as claimed in claim 19, wherein said needle is inserted through said foil seal in such a manner that only part of said active tip portion passes through the foil seal.

* * * * *